No. 876,376. PATENTED JAN. 14, 1908.
F. MITCHELL & F. GUNN.
CLAMP FOR SECURING PLANKS OF SCAFFOLDS TOGETHER, APPLICABLE ALSO
FOR USE IN CONNECTION WITH PLANKS FOR OTHER PURPOSES.
APPLICATION FILED MAR. 13, 1907.
2 SHEETS—SHEET 1.
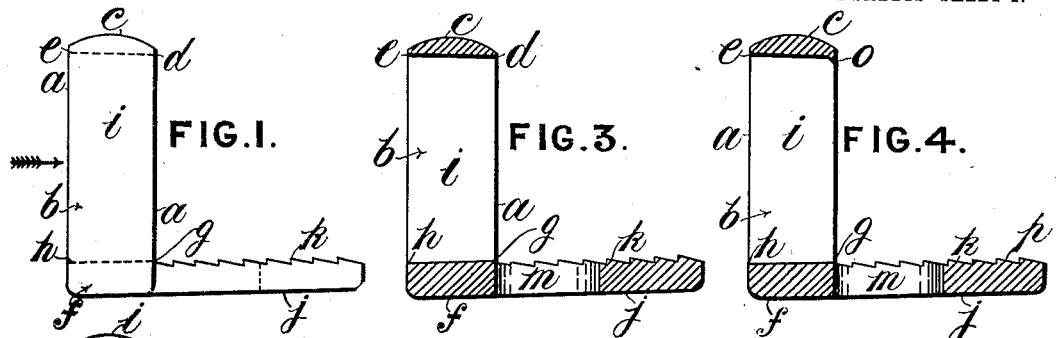
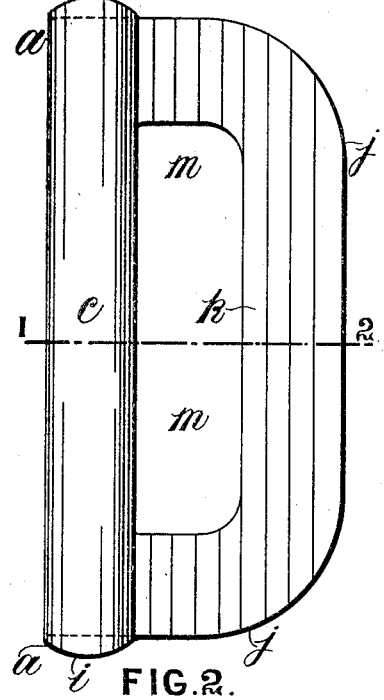
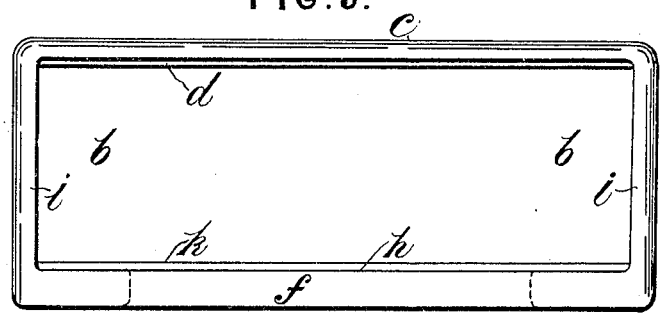
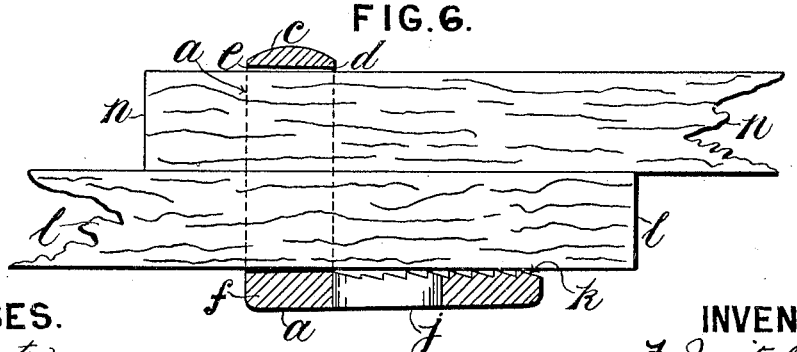
WITNESSES.
Joseph Benton.
Charles Orton.
INVENTORS
F. Mitchell
F. Gunn
By William B. Taylor
Atty No. 876,376. PATENTED JAN. 14, 1908.
F. MITCHELL & F. GUNN.
CLAMP FOR SECURING PLANKS OF SCAFFOLDS TOGETHER, APPLICABLE ALSO FOR USE IN CONNECTION WITH PLANKS FOR OTHER PURPOSES.
APPLICATION FILED MAR. 13, 1907.

2 SHEETS—SHEET 2.

WITNESSES.
Joseph Benton.
Charles Orton.

INVENTORS.
F. Mitchell
F. Gunn
By William B. Taylor
Atty

UNITED STATES PATENT OFFICE.

FREDERICK MITCHELL AND FRANCIS GUNN, OF MANCHESTER, ENGLAND.

CLAMP FOR SECURING PLANKS OF SCAFFOLDS TOGETHER, APPLICABLE ALSO FOR USE IN CONNECTION WITH PLANKS FOR OTHER PURPOSES.

No. 876,376.      Specification of Letters Patent.      Patented Jan. 14, 1908.

Application filed March 13, 1907. Serial No. 362,144.

*To all whom it may concern:*

Be it known that we, FREDERICK MITCHELL and FRANCIS GUNN, subjects of the King of Great Britain and Ireland, and residents of Manchester, in the county of Lancaster, England, agents and factors, have invented a certain new and useful improved clamp for securing planks of scaffolding together, applicable also for use in connection with planks for other purposes, of which the following is a specification.

This invention relates to an improved clamp for securing planks of scaffolding together though it may be used in connection with planks for other purposes, the object being to provide a simple, cheap and efficient device which will secure two planks together one on top of the other in a firm manner and prevent any possibility of their becoming loose when in working position.

Figure 7:
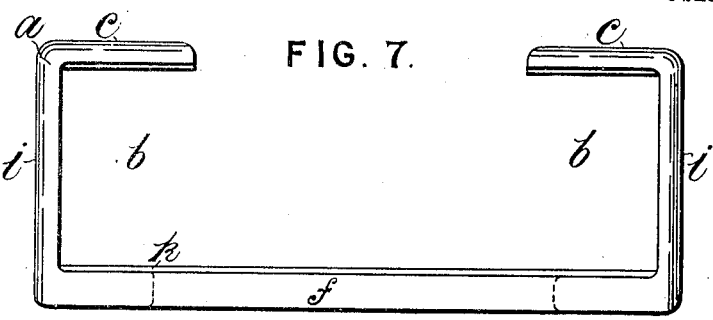
Figure 8:
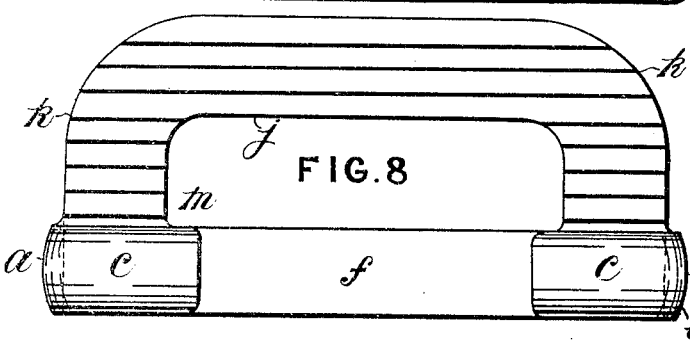
Figure 9:
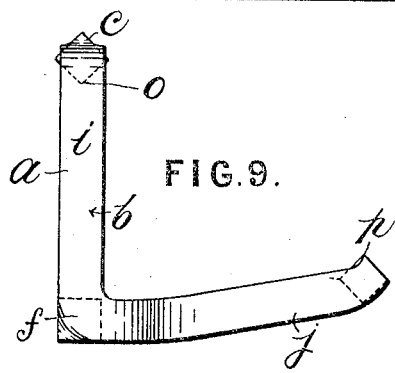
Figure 10:
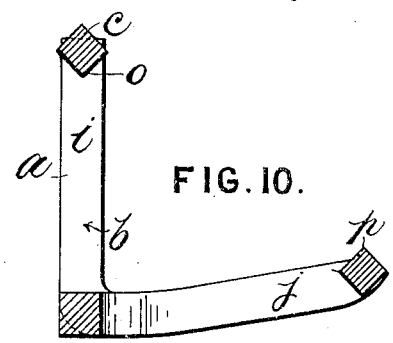
Figure 11:
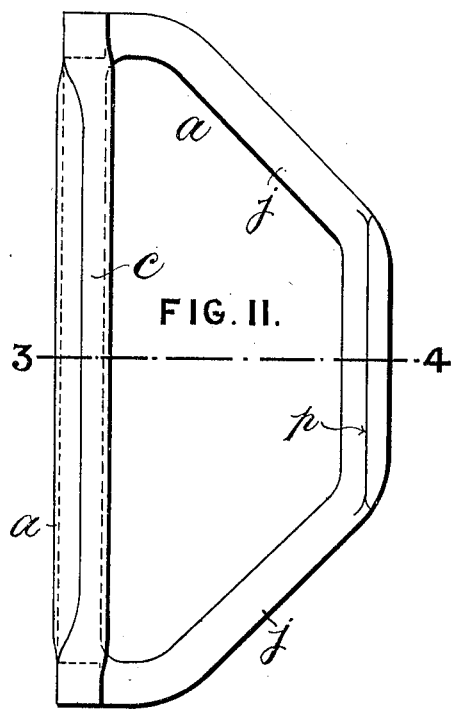

Our invention will be fully described with reference to the accompanying drawings in which Figure 1 is an elevation of a clamp constructed in accordance with our invention. Fig. 2 plan of same, Fig. 3 sectional end elevation of Fig. 2 on line 1, 2, Fig. 4 similar view to Fig. 3 arranged in a slightly modified form, Fig. 5 side elevation of Fig. 1 looking in the direction of the arrow, Fig. 6 sectional elevation of the clamp similar to Fig. 3 with two planks in position connected or coupled by the clamp, Figs. 7 and 8 show side elevation and plan, respectively, of a modified form of the clamp and Figs. 9, 10 and 11 end elevation, transverse section on line 3-4 of Fig. 11, and plan, respectively, of a further form of construction.

In carrying out our invention we make the clamp of forged wrought iron or steel or of cast steel or malleable iron or of any other material suitable for the purpose. As will be seen from the drawings it consists of a brace $a$ formed with a rectangular hole $b$ therethrough, the top member $c$ of the brace being slightly inclined to the horizontal that is to say being slightly lower at the point $d$ than at $e$ while the bottom member $f$ of the brace may be horizontal or slightly inclined upward so as to be higher at $g$ than at $h$ while the end members $i$ are usually arranged at right angles to the horizontal members. Formed in one with or firmly secured to the lower member $f$ is a projecting loop $j$ the underside of which is plain while its upper surface is inclined upwards with the highest point at the farthest distance away from the member $f$ such upper surface being provided with longitudinal saw-tooth shaped serrations $k$ adapted to embed themselves somewhat into the lower plank $l$ when the clamp is in working position. We would, however, have it understood that in place of serrations formed in the manner described we may roughen said surface in any other suitable or convenient way for the same purpose. The loop $j$ is cut out at $m$ or may be a solid piece if desired.

To apply a clamp of the character described to planks $l$ and $n$ the clamp may be turned up on one of its ends so that the loop $j$ is vertical. One plank is then placed on its edge and the clamp slid over it after which the second plank is placed on its edge and slid into the clamp against the first plank so as to overlap somewhat as indicated in Fig. 6, the hole $b$ being sufficient to allow the two planks to be readily passed therethrough. After being placed in the position described the planks are laid on their flat side when their weight causes the clamp to sufficiently grip and hold together. If a further weight is applied to the planks especially when they are supported at their outer ends with the clamp in the center the serrated teeth on the clamp take into or against the lower plank as already described while the transversely-inclined upper member $c$ comes against or embeds slightly into the upper surface of the top plank. The planks are therefore most securely held together. It is obvious that similarly three or more planks may be held together by the use of two or more clamps and this in many instances saves the use of additional supporting trestles in long stretches of scaffolding.

In Fig. 4 the underside of the upper member $c$ may be horizontal or inclined as before described but in addition we may form longitudinally of said member a projecting sharp edge $o$ or one or more projecting points, adapted to engage with the upper surface of the top plank for the purpose already described.

We have indicated the top member $c$ and side members $i$ as being made of fishback section or a section somewhat rounded on the outer side but we would have it understood that the section may be varied and still be effective. For instance, the section may be rectangular (as in Figs. 9 to 11) and preferably with the corners *p* arranged in a central vertical line or in other words with the sides of the rectangle at an angle. In this way the corners may be utilized to engage with the upper surface of the plank, as at *o*, and the lower surface of bottom plank at *p*, Fig. 4.

In Figs. 7 and 8 the upper member *c* is cut away at the middle as indicated whereby the amount of metal utilized in making the clamp is reduced. In other respects the clamp shown in these figures is of similar construction to that shown in Figs. 1 and 2.

What we claim as our invention and desire to secure by Letters Patent is:—

1. An improved scaffold clamp having a rectangular brace to surround the scaffold planks with its top member slightly inclined, a loop projecting at the lower side of said brace having its upper surface inclined and a number of serrated teeth on the upper face of said loop substantially as described.

2. An improved scaffold clamp having a rectangular brace to surround the scaffold planks with its top member slightly inclined, a loop projecting at the lower side of said brace having its upper surface inclined and roughened substantially as described.

3. An improved scaffold clamp having a rectangular brace to surround the scaffold planks with its top member slightly inclined, a loop projecting at the lower side of said brace having its upper surface inclined and provided with a sharp edge substantially as described.

4. An improved scaffold clamp having a rectangular brace to surround the scaffold planks with its top member slightly inclined, a loop projecting at the lower side of said brace having its upper surface inclined and provided with a plurality of points substantially as described.

5. An improved scaffold clamp having a rectangular brace to surround the scaffold planks with its top member slightly inclined, a plate projecting at the lower side of said brace having its upper surface inclined and a number of serrated teeth on the upper face of said plate substantially as described.

6. An improved scaffold clamp having a rectangular brace to surround the scaffold planks with its top member slightly inclined, a plate projecting at the lower side of said brace having its upper surface inclined and roughened substantially as described.

7. An improved scaffold clamp having a rectangular brace to surround the scaffold planks with its top member slightly inclined, a plate projecting at the lower side of said brace having its upper surface inclined and provided with a sharp edge substantially as described.

8. An improved scaffold clamp having a rectangular brace to surround the scaffold planks with its top member slightly inclined, a plate projecting at the lower side of said brace having its upper surface inclined and provided with a plurality of points, substantially as described.

9. An improved scaffold clamp having a rectangular brace with its upper member disconnected so as to only partially surround the scaffold planks, said top member being slightly inclined, a loop projecting at the lower side of said brace having its upper surface inclined and a number of serrated teeth on the upper face of said loop substantially as described.

10. An improved scaffold clamp having a rectangular brace with its upper member disconnected so as to only partially surround the scaffold planks, said top member being slightly inclined, a loop projecting at the lower side of said brace, having its upper surface inclined and roughened substantially as described.

11. An improved scaffold clamp having a rectangular brace with its upper member disconnected so as to only partially surround the scaffold planks, said top member being slightly inclined, a loop projecting at the lower side of said brace having its upper surface inclined and provided with a sharp edge substantially as described.

12. An improved scaffold clamp having a rectangular brace with its upper member disconnected so as to only partially surround the scaffold planks, said top member being slightly inclined, a loop projecting at the lower side of said brace having its upper surface inclined and provided with a plurality of points substantially as described.

13. An improved scaffold clamp having a rectangular brace with its upper member disconnected so as to only partially surround the scaffold planks, said top member being slightly inclined, a plate projecting at the lower side of said brace having its upper surface inclined and a number of serrated teeth on the upper face of said plate substantially as described.

14. An improved scaffold clamp having a rectangular brace with its upper member disconnected so as to only partially surround the scaffold planks, said top member being slightly inclined, a plate projecting at the lower side of said brace having its upper surface inclined and roughened substantially as described.

15. An improved scaffold clamp having a rectangular brace with its upper member disconnected so as to only partially surround the scaffold planks, said top member being slightly inclined, a plate projecting at the lower side of said brace having its upper surface inclined and provided with a sharp edge substantially as described.

16. An improved scaffold clamp having a rectangular brace with its upper member disconnected so as to only partially surround the scaffold planks, said top member being slightly inclined, a plate projecting at the lower side of said brace having its upper surface inclined and provided with a plurality of points substantially as described.

17. An improved scaffold clamp having a rectangular brace to surround the scaffold planks, with its top member slightly inclined and provided with a sharp downwardly projecting edge, a loop projecting at the lower side of said brace having its upper surface inclined and a number of serrated teeth on the upper face of said loop substantially as described.

18. An improved scaffold clamp having a rectangular brace to surround the scaffold planks, with its top member slightly inclined and provided with a sharp downwardly projecting edge, a plate projecting at the lower side of said brace having its upper surface inclined and a number of serrated teeth on the upper face of said plate substantially as described.

19. An improved scaffold clamp having a rectangular brace, to surround the scaffold planks. a loop formed integral with said brace and projecting and inclining upwardly therefrom, the top member of the brace and end member of the loop having the material of which they are formed twisted to present sharp angular edges to the scaffold planks substantially as described.

In testimony whereof we have hereunto set our hands in the presence of two witnesses.

FREDERICK MITCHELL.
FRANCIS GUNN.

Witnesses:
WILLIAM HENRY TAYLOR,
MABEL LEE.